United States Patent [19]
Yang

[11] Patent Number: 5,991,944
[45] Date of Patent: Nov. 30, 1999

[54] PLAYYARD/BASSINET SYSTEM

[75] Inventor: Jack Yang, Taipei, Taiwan

[73] Assignee: Evenflo Company, Inc., Vandalia, Ohio

[21] Appl. No.: 09/174,006

[22] Filed: Oct. 16, 1998

[51] Int. Cl.[6] .................................................. A47D 7/00
[52] U.S. Cl. ........................... 5/99.1; 403/231; 403/381; 5/93.1
[58] Field of Search ........................... 5/93.1, 99.1, 93.2, 5/95, 94, 98.1; 403/231, 381

[56] References Cited

U.S. PATENT DOCUMENTS

| | | | |
|---|---|---|---|
| 2,553,087 | 5/1951 | Hanson | 5/93.1 |
| 3,848,277 | 11/1974 | Reguitti | 5/93.1 |
| 4,967,432 | 11/1990 | Kujawski et al. | 5/98.1 |
| 5,339,470 | 8/1994 | Shamie | 5/98.1 |
| 5,553,336 | 9/1996 | Mariol | 5/93.1 |
| 5,615,427 | 4/1997 | Huang | 5/99.1 |
| 5,778,465 | 7/1998 | Myers | 5/99.1 |

*Primary Examiner*—Alexander Grosz
*Attorney, Agent, or Firm*—Thompson Hine & Flory LLP

[57] ABSTRACT

A coupling assembly to removably join a bassinet to a playyard including two rectangular playyard blocks locatable on interior faces of each upper corner bracket of a playyard and spaced from the apex thereof and with vertically extending undercut regions on the edge of each playyard block facing the apex an a cooperable bassinet block removably receivable within each playyard block, each bassinet block having outwardly facing cylindrical apertures at right angles with respect to each other for the receipt of adjacent bassinet rails during operation and use and with a vertically extending projection positionable from above to within the undercut regions of the playyard blocks and with an abutment surface thereabove to limit downward motion of the bassinet blocks when located within the playyard blocks.

5 Claims, 4 Drawing Sheets

PLAYYARD/BASSINET SYSTEM

BACKGROUND OF THE INVENTION

1. Field of the Invention

The present invention relates to a playyard/bassinet system and more particularly pertains to extending the utility of playyards and bassinets through a bassinet conveniently positionable in a playyard.

2. Description of the Prior Art

The use of child care products of known designs and configurations is known in the prior art. More specifically, child care products of known designs and configurations heretofore devised and utilized for the purpose of converting child care products for extended utility through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,967,432 to Kujawski discloses a Baby Playpen-Bassinet Combination. U.S. Pat. No. 5,339,470 to Shamie discloses a Combination Foldable Playpen and Dressing/Changing Table. U.S. Pat. No. 5,349,709 to Cheng discloses an Elevated Floorboard Frame for a Playpen and Baby Bed. U.S. Pat. No. 5,553,336 to Mariol discloses a Playyard and Bassinet Combination.

While these devices fulfill their respective, particular objectives and requirements, the aforementioned patents do not describe playyard/bassinet systems that allow extending the utility of playyards and bassinets through a bassinet conveniently positionable in a playyard.

In this respect, the playyard/bassinet system according to the present invention substantially departs from the conventional concepts and designs of the prior art, and in doing so provides an apparatus primarily developed for the purpose of extending the utility of playyards and bassinets through a bassinet readily removably positioned in a playyard.

Therefore, it can be appreciated that there exists a continuing need for a new and improved playyard/bassinet system which can be used to extend the utility of playyards and bassinets through a bassinet positionable and removable with respect to a playyard. In this regard, the present invention substantially fulfills this need.

SUMMARY OF THE INVENTION

In view of the foregoing disadvantages inherent in the known types of child care products of known designs and configurations now present in the prior art, the present invention provides an improved playyard/bassinet system. As such, the general purpose of the present invention, which will be described subsequently in greater detail, is to provide a new and improved playyard/bassinet system and method which has all the advantages of the prior art and none of the disadvantages.

To attain this, the present invention essentially comprises a new and improved playyard/bassinet system comprising, in combination, a playyard in a generally rectilinear configuration with four horizontal upper rails in a generally rectangular configuration, each upper rail being pivotable at its midpoint and with exterior ends and with upper corner brackets pivotally receiving the exterior ends of the upper rails, each upper corner bracket having a vertical apex and interior faces at right angles with respect to each other, four horizontal lower rails positioned in a generally rectangular configuration beneath the upper rails, each lower rail being pivotable at its midpoint and with exterior ends and with lower corner brackets pivotally receiving the exterior ends of the lower rails, four vertically oriented corner rails coupling the upper and lower corner brackets, and with a fabric enclosure encompassing the regions between the upper and lower rails and vertical rails to constitute side enclosures and with a bottom enclosure and with an open top; a removable bassinet supportable within the playyard having four bassinet rails positionable in a rectangular configuration and with a generally rectilinear fabric support having a lower fabric floor positionably spaced above the bottom enclosure of the playyard and with an open upper edge formed in loops for being supported by the bassinet rails when deployed for operation and use; a relatively rigid mattress positionable upon the floor of the bassinet during operation and use; and a coupling assembly to removably join the bassinet to the playyard comprising two rectangular playyard blocks located on interior faces of each upper corner bracket and spaced from the apex and with vertically extending undercut regions on the edge of the each playyard facing the apex and a cooperable bassinet block removably receivable within each two playyard blocks, each bassinet block having outwardly facing horizontally disposed cylindrical apertures at right angles with respect to each other for the receipt of adjacent bassinet rails during operation and use and with a vertically extending projection positionable from above to within the undercut regions of the playyard blocks and with an abutment surface thereabove to limit downward motion of the bassinet blocks when located within the playyard blocks, the exterior ends of the bassinet rails being provided with radial projections with a complementary recess in the apertures of the bassinet blocks for the proper rotational orientation of the bassinet rails with respect to the bassinet blocks.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved playyard/bassinet system which has all of the advantages of the prior art child care products of known designs and configurations and none of the disadvantages.

It is another object of the present invention to provide a new and improved playyard/bassinet system which may be easily and efficiently manufactured and marketed and deployed with maximum safety.

It is a further object of the present invention to provide a new and improved playyard/bassinet system which is of durable and reliable constructions and conveniently assembled and disassembled.

An even further object of the present invention is to provide a new and improved playyard/bassinet system which is susceptible of a low cost of manufacture with regard to both materials and labor, and which accordingly is then susceptible of low prices of sale to the consuming public, thereby making such playyard/bassinet system economically available to the buying public.

Even still another object of the present invention is to provide a playyard/bassinet system to extend the utility of playyards and bassinets through a bassinet conveniently positionable in a playyard.

Lastly, it is an object of the present invention to provide a new and improved coupling assembly to removably join a bassinet to a playyard comprising two rectangular playyard blocks locatable on interior faces of each upper corner bracket of a playyard and spaced from the apex thereof and with generally vertically extending undercut regions on the edge of each playyard block and a cooperable bassinet block removably receivable within each two playyard blocks, each bassinet block having outwardly facing apertures at right angles with respect to each other for the receipt of adjacent bassinet rails during operation and use and with generally vertically extending projections positionable from above to within the undercut regions of the playyard blocks and with an abutment surface thereabove to limit downward motion of the bassinet blocks when located within the playyard blocks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
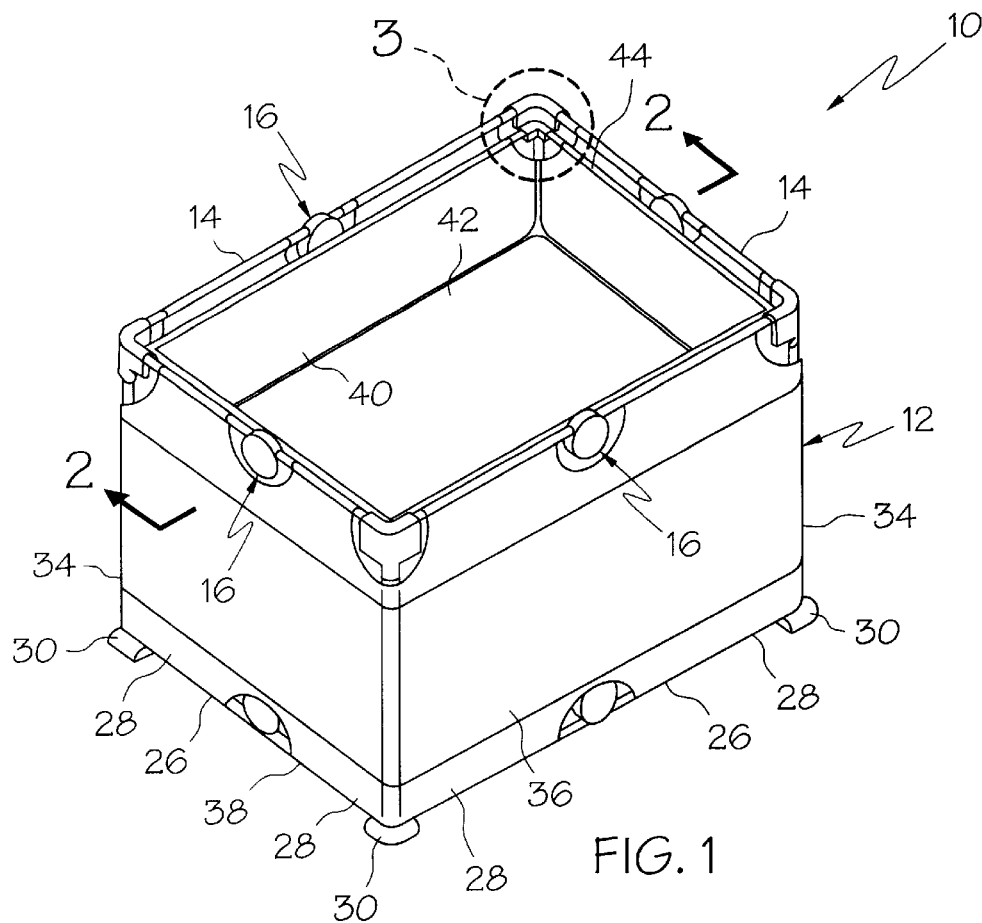
FIG. 1 is a perspective view of the preferred embodiment of the playyard/bassinet system constructed in accordance with the principles of the present invention.
Figure 2:
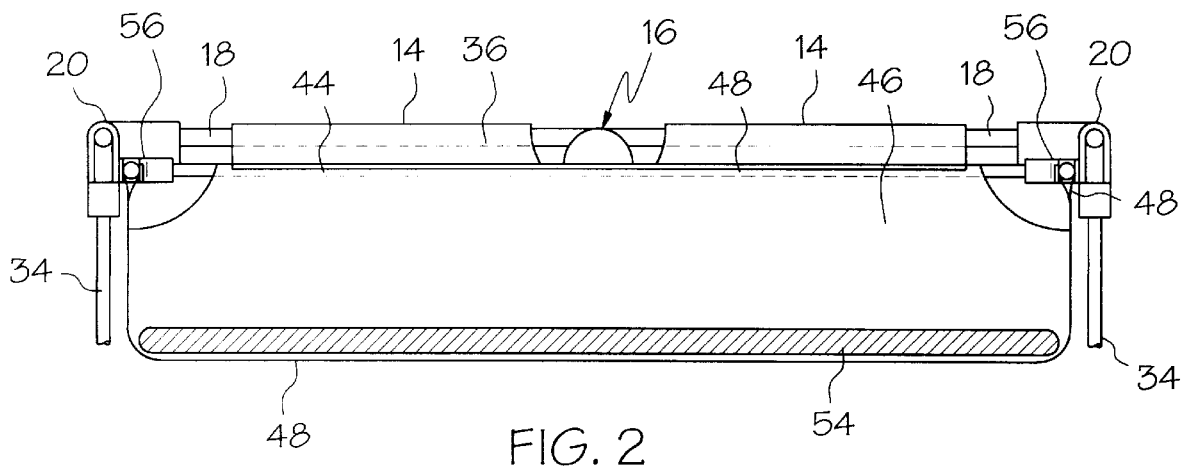
FIG. 2 is a cross-sectional view taken along line 2—2 of FIG. 1.
Figure 3:
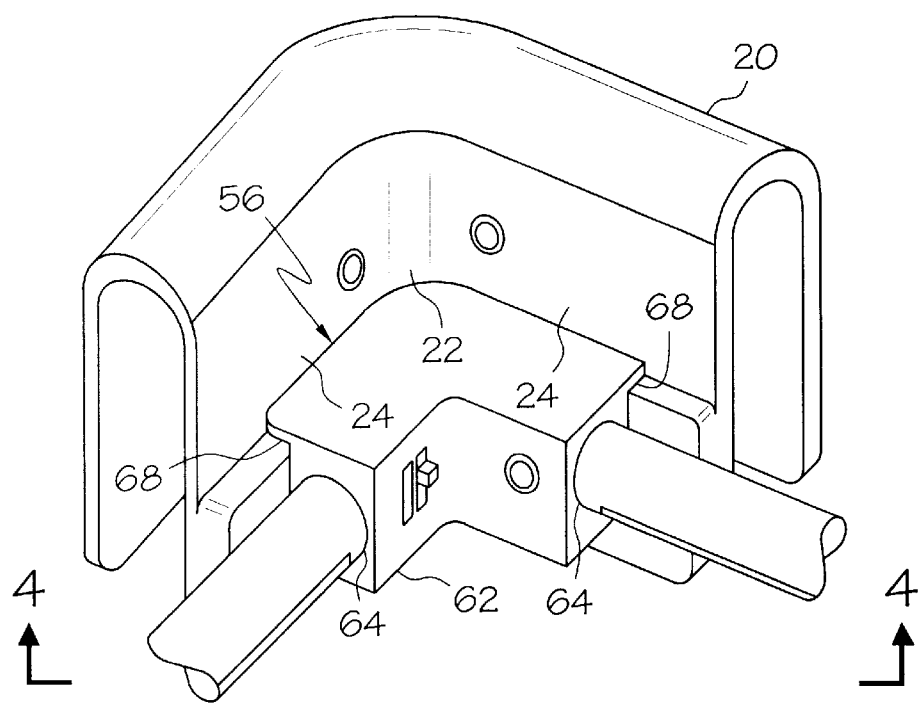
FIG. 3 is an enlarged perspective illustration of one corner bracket of the system shown at circle 3 of FIG. 1.
Figure 4:
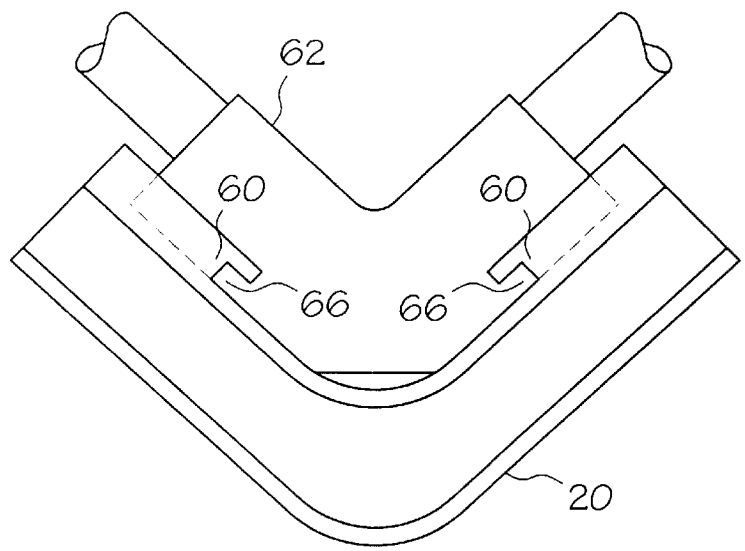
FIG. 4 is a bottom elevational view taken along line 4—4 of FIG. 3.
Figure 5:
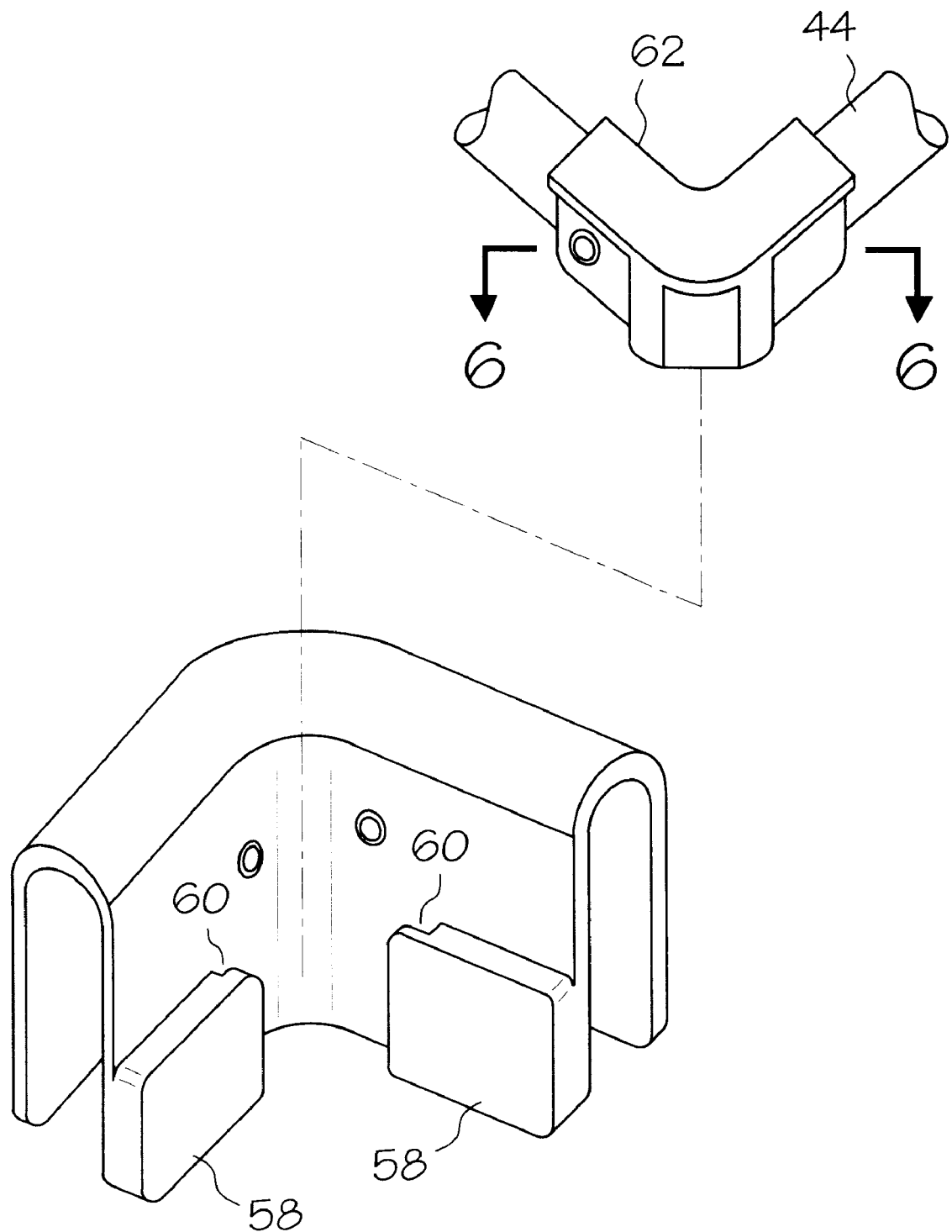
FIG. 5 is an exploded perspective view of the apparatus shown in FIG. 3.
Figure 6:
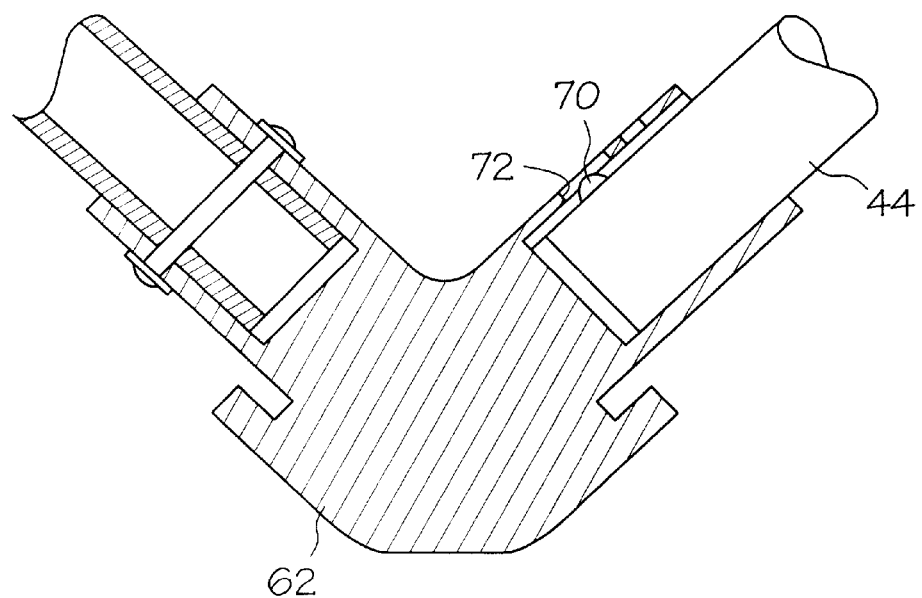
FIG. 6 is a cross-sectional view taken along line 6—6 of FIG. 5.
Figure 7:
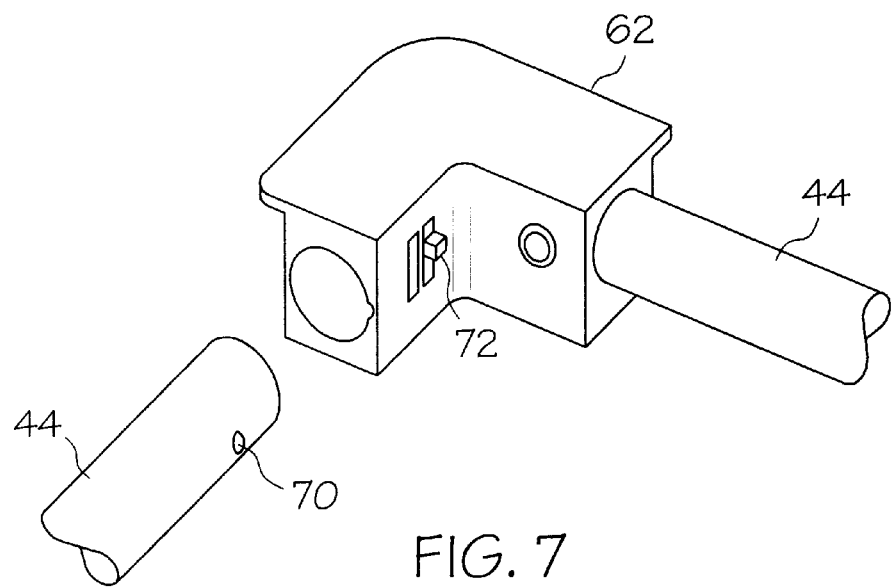
FIG. 7 is an exploded perspective view of a bassinet bracket and associated rail.

With reference now to the drawings, and in particular to FIG. 1 thereof, the preferred embodiment of the new and improved playyard/bassinet system embodying the principles and concepts of the present invention and generally designated by the reference numeral 10 will be described.

The present invention, the playyard/bassinet system 10, is comprised of a plurality of components. Such components in their broadest context include a playyard, a removable bassinet assembly and a relatively rigid mattress. Such components are individually configured and correlated with respect to each other so as to attain the desired objective.

More specifically, the new and improved playyard/bassinet system 10 comprises, as a principal component, a playyard 12. The playyard is in a generally rectilinear configuration with four horizontal upper rails 14 in a generally rectangular configuration. Each upper rail is pivotable 16 at its midpoint. Each also has exterior ends 18 and four associated upper corner brackets 20 for pivotally receiving the exterior ends of the upper rails. Each upper corner bracket has a vertical apex 22 and interior faces 24 at right angles with respect to each other.

Four horizontal lower rails 26 are positioned in a generally rectangular configuration beneath the upper rails. Each lower rail is pivotable at its midpoint. Each also has exterior ends 28. Four lower corner brackets 30 are next provided for pivotally receiving the exterior ends of the lower rails.

Four vertically oriented corner rails 34 couple the upper and lower corner brackets.

Lastly, as part of the playyard, a fabric enclosure 36 encompasses the regions between the upper and lower rails and vertical rails to constitute side enclosures. The fabric enclosure also includes a bottom enclosure 38 and an open top 40.

Also provided as a major component of the system is a removable bassinet 42. Such bassinet is supportable within the playyard. The bassinet has four bassinet rails 44. Such rails are positionable in a rectangular configuration. A generally rectilinear fabric support 46 is provided for being supported by the rails. The support also has a fabric floor 48 and upper edges 50 formed in loops for being supported by the bassinet rails when in operation and use. A lower horizontal support or floor 52 is positionable spaced above the bottom enclosure of the playyard.

Additionally provided is a relatively rigid mattress 54. The mattress is for positioning upon the floor of the bassinet during operation and use with a child placed thereon.

Lastly provided is a coupling assembly 56 to removably join the bassinet to the playyard. The coupling assembly comprises two rectangular playyard blocks 58. The blocks are located on interior faces of each upper corner bracket. They are spaced from the apex and are formed with generally vertically extending undercut regions 60 on the edge of the each playyard block facing the apex.

Cooperably associated with each corner bracket and its blocks is a bassinet block 62 removably receivable within each playyard block. Each bassinet block has outwardly facing cylindrical apertures 64 at right angles with respect to each other. These apertures are for the receipt of adjacent bassinet rails during operation and use. Generally vertically extending projections 66 are formed on each bassinet block and are slidably positionable from above to within the undercut regions of the playyard blocks. An abutment surface 68 is located above the projections 66 to limit the downward motion of the bassinet blocks when being located within the playyard blocks.

The exterior ends of the bassinet rails are preferably provided with radial projections 70. Complementary recess 72 in the apertures of the bassinet blocks receive the projections 70. This allows for the proper rotational orientation of the bassinet rails with respect to the bassinet blocks.

As described hereinabove, the present invention is used to secure a bassinet onto a portable playyard. The method uses a dovetail type of engagement. This female attachment is used on each of the four corners of the playyard, where one side of the female dovetail engagement is preferably ninety degrees to the other. The male portion of the dovetail are used as structural corners on the bassinet. The male engagement portions of the dovetail are also preferably ninety degrees to each other.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved playyard/bassinet system 10 comprising, in combination:

a playyard in a generally rectilinear configuration with four horizontal upper rails in a generally rectangular configuration, each upper rail being pivotable at its midpoint and with exterior ends and with upper corner brackets pivotally receiving the exterior ends of the upper rails, each upper corner bracket having a vertical apex and interior faces at right angles with respect to each other, four horizontal lower rails positioned in a generally rectangular configuration beneath the upper rails, each lower rail being pivotable at its midpoint and with exterior ends and with lower corner brackets pivotally receiving the exterior ends of the lower rails, four vertically oriented corner rails coupling the upper and lower corner brackets, and with a fabric enclosure encompassing the regions between the upper and lower rails and vertical rails to constitute side enclosures and with a bottom enclosure and with an open top;

a removable bassinet supportable within the playyard having four bassinet rails positionable in a rectangular configuration and with a generally rectilinear fabric support having a lower fabric floor positionably spaced above the bottom enclosure of the playyard and with an open upper edge formed in loops for being supported by the bassinet rails when deployed for operation and use;

a relatively rigid mattress positionable upon the floor of the bassinet during operation and use; and a coupling assembly to removably join the bassinet to the playyard comprising two rectangular playyard blocks located on interior faces of each upper corner bracket and spaced from the apex and with vertically extending undercut regions on the edge of the each playyard facing the apex and a cooperable bassinet block removably receivable within each two playyard blocks, each bassinet block having outwardly facing horizontally disposed cylindrical apertures at right angles with respect to each other for the receipt of adjacent bassinet rails during operation and use and with a vertically extending projection positionable from above to within the undercut regions of the playyard blocks and with an abutment surface thereabove to limit downward motion of the bassinet blocks when located within the playyard blocks, the exterior ends of the bassinet rails being provided with radial projections with a complementary recess in the apertures of the bassinet blocks for the proper rotational orientation of the bassinet rails with respect to the bassinet blocks.

2. A coupling assembly to removably join a bassinet to a playyard comprising two rectangular playyard blocks locatable on interior faces of each upper corner bracket of a playyard and spaced from the apex thereof and with generally vertically extending undercut regions on the edge of each playyard block and a cooperable bassinet block removably receivable within each two playyard blocks, each bassinet block having outwardly facing apertures at right angles with respect to each other for the receipt of adjacent bassinet rails during operation and use and with generally vertically extending projections positionable from above to within the undercut regions of the playyard blocks and with an abutment surface thereabove to limit downward motion of the bassinet blocks when located within the playyard blocks.

3. The assembly as set forth in claim 2 and further including cylindrical rails positionable between the bassinet blocks.

4. The assembly as set forth in claim 3 and further including a generally rectilinear fabric support with a fabric floor and an upper edge formed in loops configuration for being supported by the bassinet rails when in operation and use.

5. The assembly as set forth in claim 4 and further including a mattress positionable upon the floor of the bassinet during operation and use.

\* \* \* \* \*